(12) United States Patent
Suzuki et al.

(10) Patent No.: US 7,834,746 B2
(45) Date of Patent: Nov. 16, 2010

(54) TWO-WHEEL-VEHICLE DETECTING DEVICE FOR AN AUTOMOTIVE VEHICLE

(75) Inventors: Tadao Suzuki, Kariya (JP); Masakazu Kagawa, Inuyama (JP)

(73) Assignee: DENSO CORPORATION, Kariya (JP)

( * ) Notice: Subject to any disclaimer, the term of this patent is extended or adjusted under 35 U.S.C. 154(b) by 366 days.

(21) Appl. No.: 12/153,635

(22) Filed: May 22, 2008

(65) Prior Publication Data

US 2008/0297332 A1 Dec. 4, 2008

(30) Foreign Application Priority Data

May 31, 2007 (JP) ............................. 2007-144514

(51) Int. Cl.
*B60Q 1/00* (2006.01)
(52) U.S. Cl. ...................... 340/435; 340/933; 340/938; 340/436
(58) Field of Classification Search ................ 340/435, 340/427, 436, 904, 933, 938, 988, 432; 701/301
See application file for complete search history.

(56) References Cited

U.S. PATENT DOCUMENTS

| | | | |
|---|---|---|---|
| 5,463,384 A * | 10/1995 | Juds ........................... | 340/903 |
| 6,411,898 B2 | 6/2002 | Ishida et al. | |
| 6,574,560 B2 | 6/2003 | Abe et al. | |
| 6,900,739 B2 | 5/2005 | Su et al. | |
| 7,012,510 B2 | 3/2006 | Su et al. | |
| 7,049,945 B2 * | 5/2006 | Breed et al. .................. | 340/435 |
| 2001/0040505 A1 | 11/2001 | Ishida et al. | |
| 2003/0043479 A1 | 3/2003 | Su et al. | |
| 2003/0146828 A1 | 8/2003 | Su et al. | |
| 2008/0046150 A1 * | 2/2008 | Breed .......................... | 701/45 |
| 2009/0058677 A1 * | 3/2009 | Tseng et al. ................. | 340/904 |

FOREIGN PATENT DOCUMENTS

| JP | A-S62-124486 | 6/1987 |
|---|---|---|
| JP | U-62-117581 | 7/1987 |
| JP | A-H10-119674 | 5/1998 |
| JP | A-2000-155894 | 6/2000 |
| JP | A-2000-306194 | 11/2000 |
| JP | A-2001-301484 | 10/2001 |
| JP | A-2003-16584 | 1/2003 |
| JP | A-2003-346297 | 12/2003 |
| JP | A-2005-41398 | 2/2005 |
| JP | A-2005-339117 | 12/2005 |
| JP | A-2007-176291 | 7/2007 |

* cited by examiner

*Primary Examiner*—Toan N Pham
(74) *Attorney, Agent, or Firm*—Posz Law Group, PLC

(57) ABSTRACT

A motorcycle-detecting device according to the present invention is mounted on an automotive vehicle. The device includes ultrasonic sensors for detecting objects around the vehicle, a device for predicting that a motorcycle is approaching the vehicle, and a device for adjusting a detection distance and a detection sensitivity of the ultrasonic sensors. When the predicting means predicts a motorcycle approach, the adjusting device makes the detection distance longer than a normal distance and the detection sensitivity higher than a normal sensitivity. Illuminating devices may be mounted on the vehicle to make the motorcycle passing by visible. A warning may be given to a driver when a motorcycle passing by is actually detected by the sensors. Information regarding the detected motorcycle may be given to other vehicles. According to the present invention, the motorcycle passing by the vehicle is surely and stably detected to thereby avoid any traffic accident with the motorcycle.

6 Claims, 4 Drawing Sheets

TWO-WHEEL-VEHICLE DETECTING DEVICE FOR AN AUTOMOTIVE VEHICLE

CROSS-REFERENCE TO RELATED APPLICATION

This application is based upon and claims benefit of priority of Japanese Patent Application No. 2007-144514 filed on May 31, 2007, the content of which is incorporated herein by reference.

BACKGROUND OF THE INVENTION

1. Field of the Invention

The present invention relates to a device for detecting an obstacle, the device being mounted on an automotive vehicle, and especially to an on-board device for detecting a motorcycle and/or a bicycle passing by the automotive vehicle.

2. Description of Related Art

An example of a device having an illuminating device for illuminating objects by an automotive vehicle, such as a motorcycle passing-by, is shown in JP-A-2005-41398. The illuminating device is controlled according to detection results of ultrasonic sensors mounted on the vehicle. It is difficult for the ultrasonic sensors having a detection distance of about 1 meter to detect all of motorcycles passing by an automotive vehicle because some of the motorcycles pass by the vehicle with a distance more than 1 meter apart from the vehicle. It is also difficult to stably detect a motorcycle passing by at a high speed relative to a driving speed of the automotive vehicle, because the ultrasonic sensors are usually set to detect an object having a low relative speed.

SUMMARY OF THE INVENTION

The present invention has been made in view of the above-mentioned problem, and an object of the present invention is to provide an improved device for surely detecting a two-wheel-vehicle such as a motorcycle and a bicycle passing by an automotive vehicle.

The two-wheel-vehicle detecting device according to the present invention includes ultrasonic sensors for detecting objects around an automotive vehicle, a device for predicting that a two-wheel-vehicle is approaching the automotive vehicle and a device for adjusting a detection distance and a detection sensitivity of the ultrasonic sensors. The ultrasonic sensors may be composed of four sensors, front-left, front-right, rear-left and rear-right sensors. A word "motorcycle" is used in this specification and claims as a word representing a two-wheel-vehicle including a motorcycle and a bicycle. Similarly, the two-wheel-vehicle detecting device is represented by words "motorcycle-detecting device."

The predicting device predicts that a motorcycle is approaching the automotive vehicle, when information that a motorcycle is coming toward the automotive vehicle is received from outside, when information that the automotive vehicle is involved in heavy traffic is received, or when a driving speed of the automotive vehicle becomes lower than a predetermined speed. When the motorcycle approach is predicted, a detection distance of the ultrasonic sensors is made longer than a normal distance, and a detection sensitivity is made higher than a normal sensitivity. In this manner, the motorcycle approaching the automotive vehicle is surely and stably detected.

When the motorcycle approach is predicted, illuminating devices may be turned on to make the motorcycle passing by visible. When the motorcycle is actually detected by the ultrasonic sensors, a warning may be given to a driver to avoid an accident contacting the motorcycle. Information regarding the motorcycle passing-by may be given to other vehicles for enhance traffic safety.

Other objects and features of the present invention will become more readily apparent from a better understanding of the preferred embodiment described below with reference to the following drawings.

DETAILED DESCRIPTION OF THE PREFERRED EMBODIMENT

Figure 1:
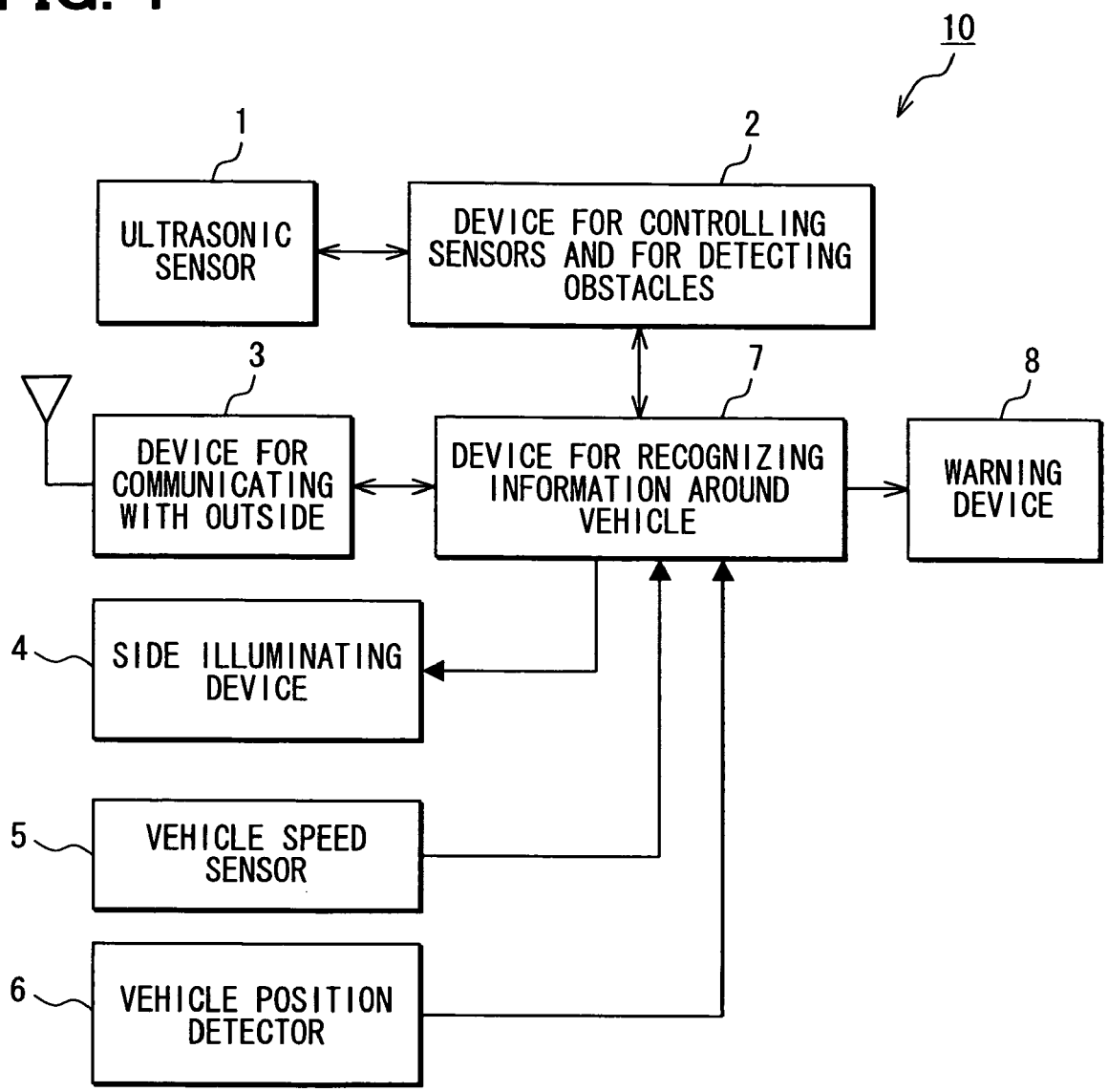
FIG. 1 is a block diagram showing an entire structure of a motorcycle-detecting device.

A preferred embodiment of the present invention will be described with reference to accompanying drawings. An entire structure of a motorcycle-detecting device will be described with reference to FIG. 1. The motorcycle-detecting device 10 is composed of ultrasonic sensors 1 consisting of ultrasonic sensors 1FL (front left), 1FR (front right), 1RL (rear left) and 1RR (rear right), a device 2 for controlling sensors and for detecting obstacles, a device 3 for communicating with an outside, device 4 for illuminating sides of the vehicle consisting of 4L and 4R, a vehicle speed sensor 5, a vehicle position detector 6, a device 7 for recognizing information around the vehicle, and a warning device 8.

Figure 5:
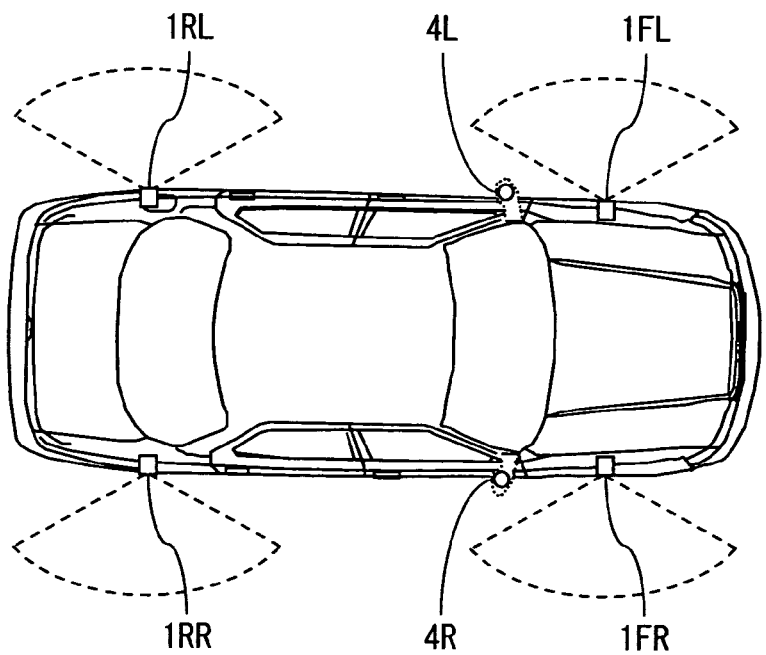
FIG. 5 is a plan view showing a vehicle on which ultrasonic sensors and illuminating devices are mounted.

The ultrasonic sensors 1 (1FL, 1FR, 1RL, 1RR) are installed on the automotive vehicle as shown in FIG. 5. A detecting range of each ultrasonic sensor 1 is shown with a dotted line. Obstacles located around the vehicle are detected by echoes of the ultrasonic waves transmitted from the ultrasonic sensors 1 and reflected on the obstacles. The detecting range can be adjusted by the device 2 for controlling sensors. The device 2 for controlling sensors and for detecting obstacles adjusts timing for transmitting ultrasonic waves form the ultrasonic sensors 1 and calculates a distance from the vehicle to the obstacle based on an elapsed time from transmission of the ultrasonic waves to receipt of the reflected ultrasonic waves. The device 2 adjusts a detection distance ET and a detection sensitivity TH of the ultrasonic sensors 1.

The device 3 for communicating with an outside is able to communicate with stationary devices provided at road sides and other vehicles. The device 3 also communicates with stationary stations of VICS (Vehicle Information and Communication System) using FM broadcasting signals and beacon waves. The side illuminating devices 4 (4L and 4R) are installed in the left and right door mirrors of the vehicle as shown in FIG. 5. The side illuminating devices 4 are turned on or turned off according to commands from the device 7 for recognizing information around the vehicle. By turning on the side illuminating devices 4, both sides of the vehicle are illuminated.

The vehicle speed sensor 5 detects a driving speed of the vehicle. The vehicle position detector 6 detects a present position of the vehicle and a present driving direction based on data received from a GPS (Global Positioning System) and a gyro-sensor. The warning device 8 gives a warning to a driver when obstacles such as a motorcycle are detected by the ultrasonic sensors 1. The warning can be given in various forms such as sounds, lights or vibrations.

The device 7 for recognizing information around the vehicle predicts whether a motorcycle is approaching to the own vehicle based on information fed from the device 2 for controlling sensors and for detecting obstacles and device 3 for communicating with an outside. When it is predicted that a motorcycle is approaching the own vehicle, the side illuminating devices 4 (4L, 4R) are turned on so that the driver is able to catch the approaching motorcycle in his/her sight.

Figure 4:
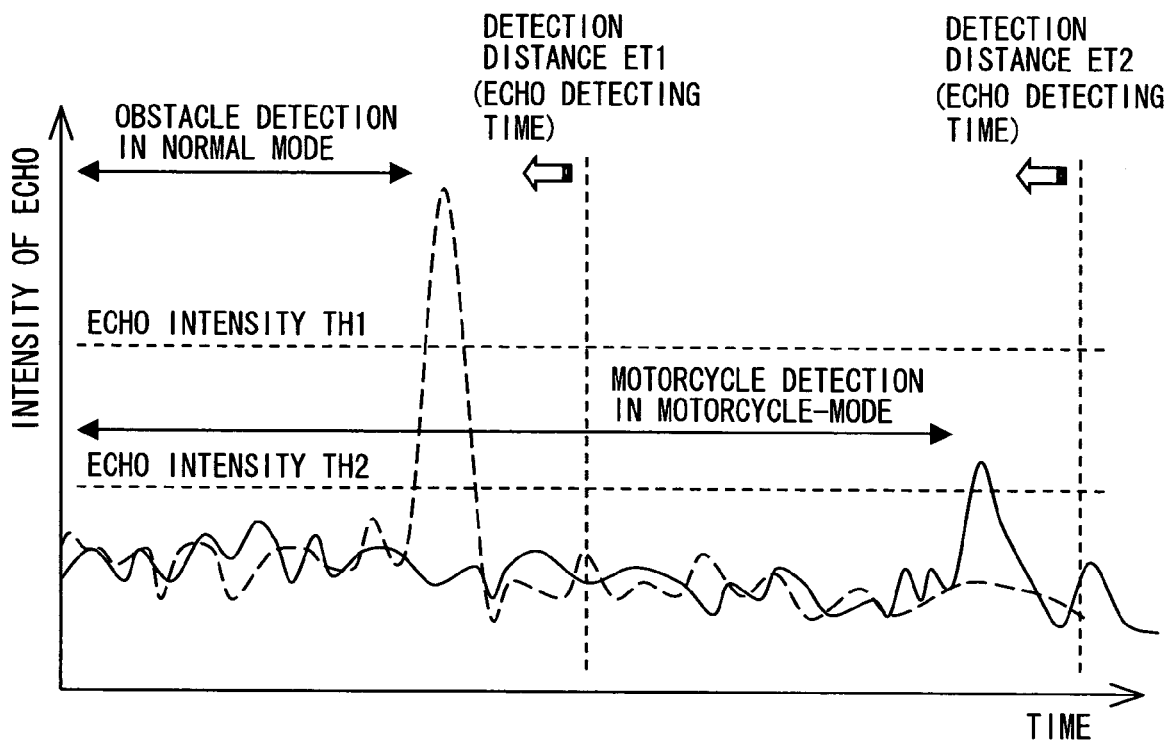
FIG. 4 is a graph showing intensity of echo relative to time lapsed after a ultrasonic sensor is activated.

The device 7 for recognizing information around the vehicle also changes a detection distance ET (corresponding to a time period for detecting an echo from an obstacle) and a detection sensitivity TH (corresponding to detectable intensity of echoes) of the ultrasonic sensors 1 (1FL, 1FR, 1RL, 1RR) when it is predicted that a motorcycle is approaching the vehicle. The changes of the detection distance ET and the detection sensitivity of the ultrasonic sensors 1 are illustrated in FIG. 4. In FIG. 4, time counted from a time when the ultrasonic waves are sent from the ultrasonic sensors 1 is shown on the abscissa, and an intensity of the reflected echoes is shown on the ordinate. A line TH1 shows a normal intensity of the echo to be detected, and a line TH2 shows a motorcycle-mode intensity of the echo to be detected when it is predicted that a motorcycle is approaching the vehicle. A line ET1 shows a time period in which reflected waves are detected (the time period corresponds to a normal distance set in a normal condition). A line ET2 shows a time period in which reflected waves are detected (the time period corresponds to a motorcycle-mode distance which is set when it is predicted that a motorcycle is approaching the vehicle.

When it is predicted that a motorcycle is approaching the vehicle, the normal distance ET1 to detect an obstacle is extended to the motorcycle-mode distance ET2, and the normal sensitivity TH1 is changed (increased) to the motorcycle-mode sensitivity TH2. In other words, in the motorcycle-mode where it is predicted that a motorcycle is approaching the vehicle, the detectable distance is prolonged to ET2 and the sensitivity level is brought to the TH2. In other words, in the motorcycle-mode, the ability of the ultrasonic sensors 1 for detecting a motorcycle is enhanced.

Whether an object detected by the ultrasonic sensors 1 is a motorcycle or not is determined based on a time period from a time when the front ultrasonic sensor (1FL or 1FR) detected an object to a time when the rear ultrasonic sensor (1RL or 1RR) detected the same object. That is, a traveling speed of an object is calculated from the time period, and it is determined that the object is an motorcycle if the traveling speed is higher than a predetermined speed. This calculation and determination is made by the device 7 for recognizing information around the vehicle.

Figure 3:
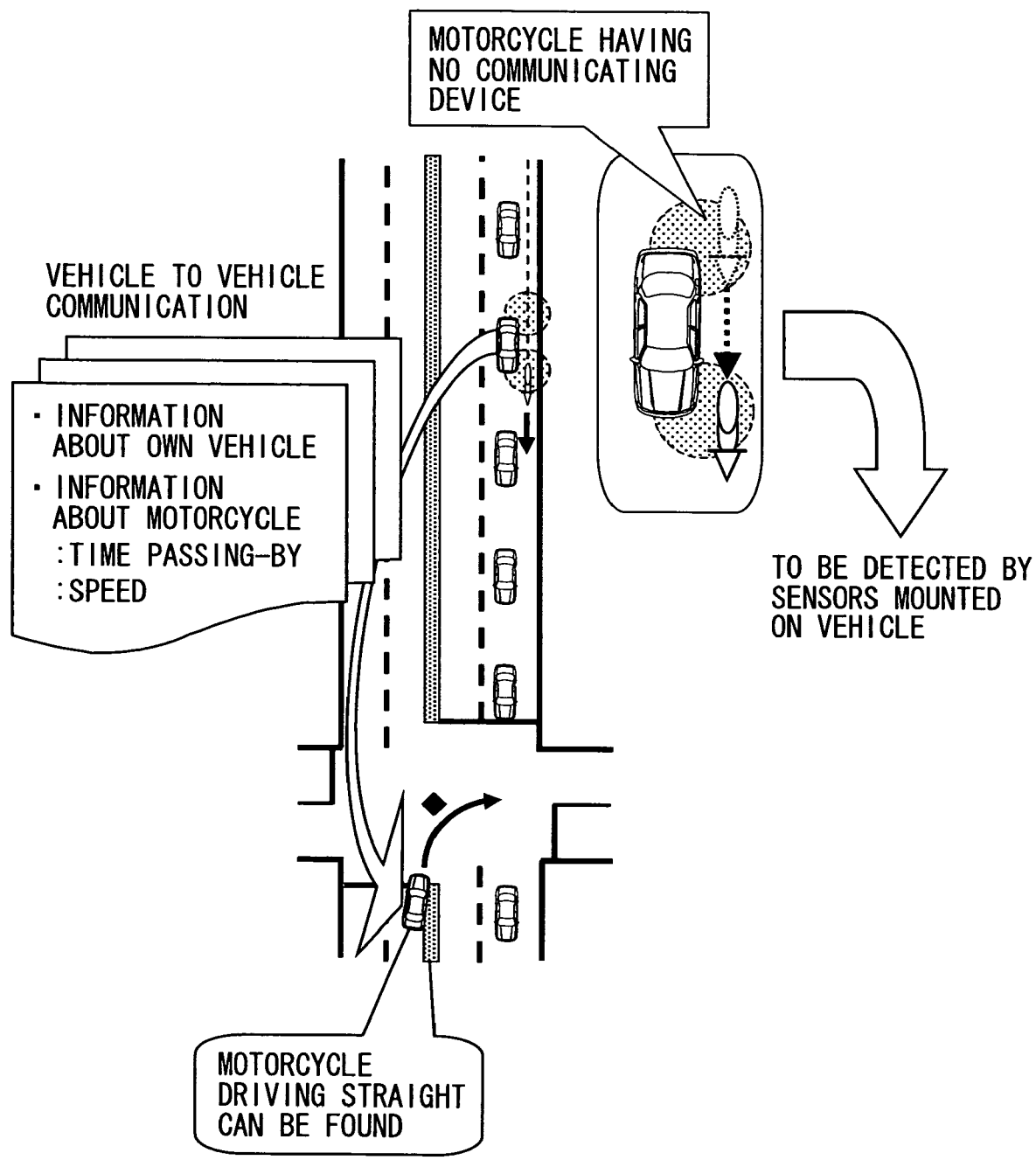
FIG. 3 is a drawing for explaining operation of the motorcycle-detecting device.

When the ultrasonic sensors 1 detect a motorcycle passing through a side of the vehicle after the detection distance ET and the detection sensitivity TH are adjusted, the device 7 for recognizing information around the vehicle gives a driver a warning from the warning device 8. Further, the device 3 transmits the information to other vehicles by means of vehicle-to-vehicle communication or communication via a roadside device, as shown in FIG. 3. The information includes: a position and a driving direction of the own vehicle; a time when detected motorcycle passed through a side of the own vehicle; and a driving speed of the motorcycle.

In this manner, information regarding the motorcycle is transmitted to other vehicles. For example, if there is another vehicle that is about to turn right at an intersection in front of the own vehicle, as shown in FIG. 3, the information regarding the motorcycle passing through the own vehicle is given to a driver of the other vehicle. The driver of the other vehicle is able to avoid a possible accident with the motorcycle based on the information received.

Figure 2:
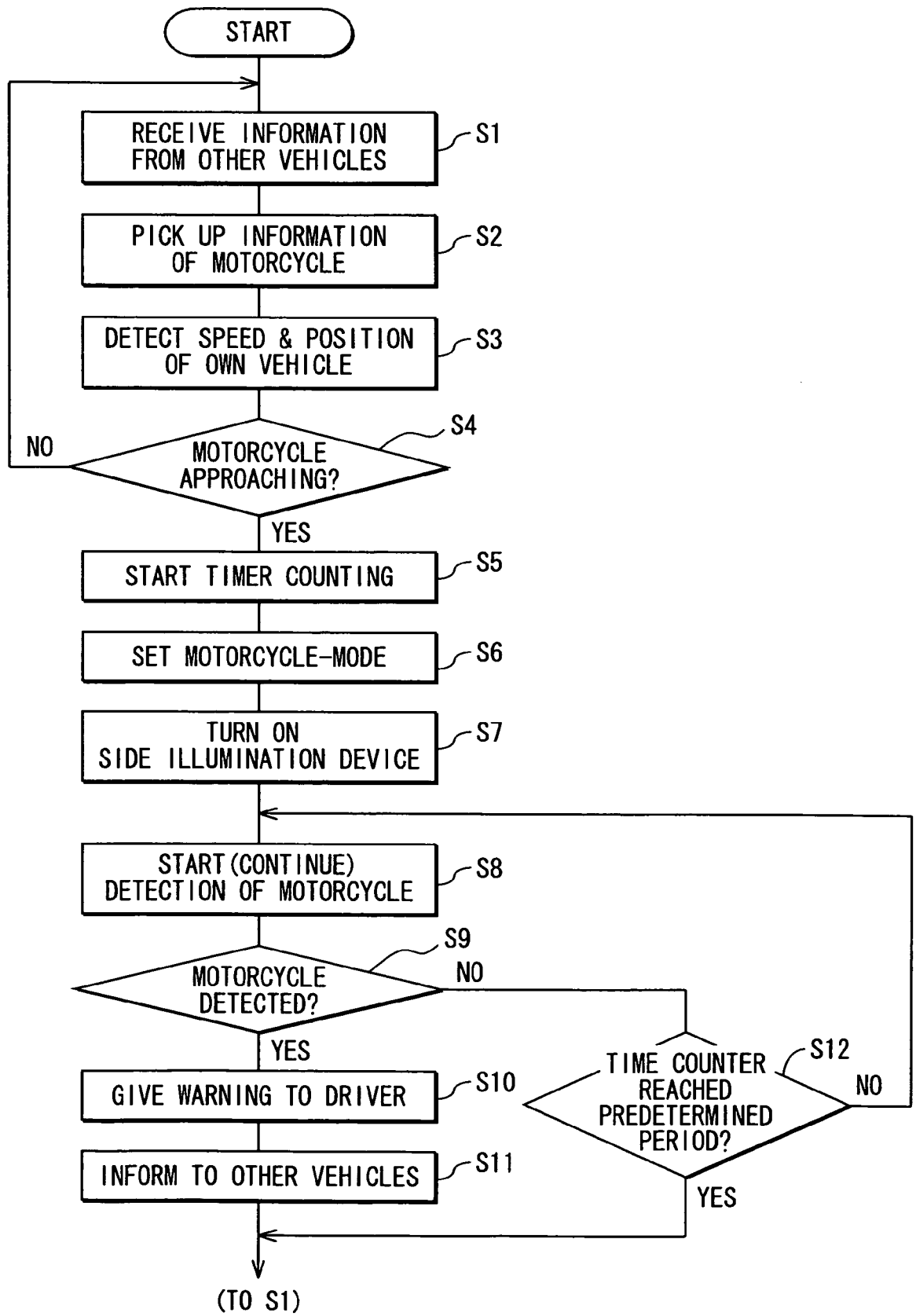
FIG. 2 is a flowchart showing a process of detecting a motorcycle passing by an automotive vehicle.

With reference to FIG. 2, a process for detecting a motorcycle will be described. At step S1, information transmitted from other vehicles via a communication system is received. At step S2, if the information includes a piece of information that there is a motorcycle coming toward the own vehicle, the information regarding the motorcycle is picked up. At step S3, a present driving speed and a present position of the own vehicle are detected. At step S4, it is predicted whether the motorcycle is actually approaching the own vehicle based the motorcycle information picked up at step S2 and the speed and position of the own vehicle detected at step S3. If it is predicted that the motorcycle is approaching the own vehicle at step S4, the process proceeds to following steps S5-S12. If not predicted, the process returns to step S1 to repeat steps S1-S4.

At step S5, timer-counting is started. At step S6, the detection mode of the ultrasonic sensor 1 is switched from a normal mode to a motorcycle-mode. That is, the detection distance is changed from ET1 to ET2, and the detection sensitivity is changed from TH1 to TH2 (refer to FIG. 4). At step S7, one of the side illuminating devices 4 (4L, 4R), which is positioned at a side where the motorcycle is predicted to pass through, is turned on. Then, at step S8, detection of the motorcycle by the ultrasonic sensors 1 is started (or continued). At step S9, whether the motorcycle is detected by the ultrasonic sensors 1 or not is determined.

If the motorcycle is detected at step S9, the process proceeds to step S10, where a warning is given to the driver. At step S1, the information regarding the detected motorcycle is informed to other vehicles, and the process returns to step S1 to repeat the process. If the motorcycle is not detected at step S9, the process proceeds to step S12, where whether timer-counting started at step S5 has come to a predetermined count (i.e., a predetermined time has lapsed or not) is determined. The fact that the predetermined time has lapsed without actually detecting the motorcycle though the information that there is a motorcycle approaching is given from other vehicles may mean that the motorcycle made a turn before passing through the side of the own vehicle. If it is determined at step S12 that the predetermined time has lapsed, the process returns to step S1 to repeat the process. If the predetermined time has not lapsed yet, the process returns to step S8 to repeat steps S8 and S9.

According to the present invention, the detection distance ET is made longer and the detection sensitivity TH is made higher in the ultrasonic sensors 1 when it is predicted that a motorcycle is approaching the own vehicle. Therefore, the motorcycle passing by the own vehicle is surely and stably detected.

The present invention is not limited to the embodiment described above, but it may be variously modified. For example, though an approach of a motorcycle is predicted when preliminary information that there is a motorcycle coming toward the own vehicle is given from other vehicles in the foregoing embodiment, it is also possible to predict that a motorcycle is approaching or not when traffic on a road on which the own vehicle is driving is very heavy. This is because it is highly possible that a motorcycle passes by the own vehicle to drive through the heavy traffic. It is also possible to predict a motorcycle approach when a driving speed of the own vehicle becomes lower than a predetermined speed. This is because the driving speed becomes low when the traffic is heavy, and a possibility that a motorcycle passes by increases.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A motorcycle-detecting device mounted on an automotive vehicle, comprising:
    ultrasonic sensors for detecting objects located around the automotive vehicle;
    means for predicting whether a motorcycle is approaching the automotive vehicle; and
    means for adjusting a detection distance of the ultrasonic sensors from a normal detection distance to a motorcycle-mode distance that is longer than the normal detection distance and a detection sensitivity of the ultrasonic sensors from a normal sensitivity to a motorcycle-mode sensitivity that is higher than the normal sensitivity, when the predicting means predicts that the motorcycle is approaching the automotive vehicle.

2. The motorcycle-detecting device as in claim 1, wherein: the predicting means predicts that the motorcycle is approaching the automotive vehicle when information that there is the motorcycle coming toward the automotive vehicle is received through communication with an outside or when information that the automotive vehicle is involved in heavy traffic is received through communication with the outside.

3. The motorcycle-detecting device as in claim 1, further including: means for illuminating sides of the automotive vehicle; and means for activating the illuminating means when the predicting means predicts that the motorcycle is approaching the automotive vehicle.

4. The motorcycle-detecting device as in claim 1, further including means for transmitting information that the motorcycle is detected by the ultrasonic sensors to an outside.

5. The motorcycle-detecting device as in claim 1 further including means for giving a warning to a driver of the automotive vehicle when the ultrasonic sensors detect the motorcycle.

6. The motorcycle-detecting device as in claim 1, wherein the predicting means predicts that the motorcycle is approaching the automotive vehicle when a driving speed of the automotive vehicle becomes lower than a predetermined speed.

* * * * *